United States Patent [19]

McDonald et al.

[11] Patent Number: 4,717,434
[45] Date of Patent: * Jan. 5, 1988

[54] ZIRCONIUM ALLOY PRODUCTS

[75] Inventors: Samuel G. McDonald, Monroeville; George P. Sabol, Murrysville, both of Pa.

[73] Assignee: Westinghouse Electric Corp., Pittsburgh, Pa.

[ * ] Notice: The portion of the term of this patent subsequent to Apr. 22, 2003 has been disclaimed.

[21] Appl. No.: 838,854

[22] Filed: Mar. 12, 1986

Related U.S. Application Data

[60] Division of Ser. No. 571,122, Jan. 13, 1984, Pat. No. 4,584,030, which is a continuation-in-part of Ser. No. 343,787, Jan. 29, 1982, abandoned.

[51] Int. Cl.$^4$ .............................................. C22F 1/18
[52] U.S. Cl. .................................. 148/407; 148/421; 148/909; 376/457; 376/900; 420/422
[58] Field of Search ............ 148/407, 421, 909, 11.5 F, 148/12.7 B, 133; 376/457, 900; 420/422

[56] References Cited

U.S. PATENT DOCUMENTS

| 3,865,635 | 2/1975 | Hofvenstam et al. | 148/11.5 F |
| 4,360,389 | 11/1982 | Urquhart | 148/11.5 F |
| 4,450,016 | 5/1984 | Vesterlund et al. | 148/11.5 F |

FOREIGN PATENT DOCUMENTS

| 705863 | 3/1965 | Canada | 148/12.7 B |
| 116739 | 7/1982 | Japan | 148/421 |
| 210961 | 12/1982 | Japan | 148/11.5 F |
| 22365 | 2/1983 | Japan | 148/11.5 F |
| 22366 | 2/1983 | Japan | 148/11.5 F |
| 923212 | 4/1963 | United Kingdom | |

OTHER PUBLICATIONS

Demars et al., "Influence of the Structure of Zircaloy 2 on its Resistance to Corrosion by Steam", Memoires Scientifiques Rev. Metallurg., LXII No. 4, 1965, pp. 269-274.

Armand et al., "Influence of the Structure and the Interstital Impurities on the Corrosion of Zircaloy 2 by Water and Steam", Electrochemical Technology, vol. 4, No. 3-4, Mar.-Apr. 1966, pp. 104-108.

Anderson et al., "Beta Quenching of Zircaloy Cladding Tubes in Intermediate or Final Size—Methods to Improve Corrosion and Mechanical Properties", ASTM Fifth International Conference on Zirconium in the Nuclear Industry, Boston, MA, Aug. 4-7, 1980.

Primary Examiner—L. Dewayne Rutledge
Assistant Examiner—Robert L. McDowell
Attorney, Agent, or Firm—John J. Prizzi

[57] ABSTRACT

It has been found that modifying standard Zircaloy alloy processing techniques by limiting the working and annealing temperatures utilized after conventional beta treatment results in Zircaloy alloy product having superior high temperature steam corrosion resistance.

16 Claims, 8 Drawing Figures

ZIRCONIUM ALLOY PRODUCTS

CROSS-REFERENCE TO A RELATED APPLICATION

This is a division of application Ser. No. 06/571,122, filed Jan. 13, 1984, which is a continuation of application Ser. No. 343,787, filed Jan. 29, 1982 and expressly abandoned on Jan. 13, 1984. Ser. No. 06/571,122 issued into U.S. Pat. No. 4,584,030 on Apr. 22, 1986 in the names of McDonald et al.

Zircaloy alloy fabrication methods and resultant products which also exhibit improved high temperature, high pressure steam corrosion resistance are described in related Application Ser. No. 06/571,123 filed Jan. 13, 1984 as a continuation of Ser. No. 06/343,788 filed Jan. 29, 1982, now abandoned, assigned to the same assignee. This related application describes a process in which high energy beam thermal treatments are used to provide a layer of beta treated microstructure on Zircaloy alloy intermediate product which is subsequently alpha worked, or to provide an alpha annealed structure to a Zircaloy alloy intermediate final product. In either case a Zircaloy alloy product having enhanced high temperature, high pressure steam corrosion resistance results.

BACKGROUND OF THE INVENTION

The present invention relates to Zircaloy alloy intermediate and final products, and processes for their fabrication. More particularly, this invention is especially concerned with Zircaloy alloys having a particular microstructure, and the method of producing this microstructure, such that the material has improved long term corrosion resistance in a high temperature steam environment.

The Zircaloy alloys were initially developed as cladding materials for nuclear components used within a high temperature pressurized water reactor environment (U.S. Pat. No. 2,772,964). The Zircaloy-2 alloy is an alloy of zirconium comprising about 1.2 to 1.7 weight percent tin, about 0.07 to 0.20 weight percent iron, about 0.05 to 0.15 weight percent chromium, and about 0.03 to 0.08 weight percent nickel. The Zircaloy-4 alloy is an alloy of zirconium comprising about 1.2 to 1.7 weight percent tin, about 0.12 to 0.18 weight percent iron, and about 0.05 to 0.15 weight percent chromium (see U.S. Pat. No. 3,148,055).

In addition variations upon these alloys have been made by varying the above listed alloying elements and/or the addition of amounts of other elements. For example in some cases it may be desirable to add silicon to the Zircaloy-2 alloy composition as taught in U.S. Pat. No. 3,097,094. In addition oxygen is sometimes considered as an alloying element rather than an impurity, since it is a solid solution strengthener of zirconium.

Nuclear grade Zircaloy-2 or Zircaloy-4 alloys are made by repeated vacuum consumable electrode melting to produce a final ingot having a diameter typically between about 16 and 25 inches. The ingot is then conditioned to remove surface contamination, heated into the beta, alpha+beta phase or high temperature alpha phase and then worked to some intermediate sized and shaped billet. This primary ingot breakdown may be performed by forging, rolling, extruding or combinations of these methods. The intermediate billet is then beta solution treated by heating above the alpha+beta/beta transus temperature and then held in the beta phase for a specified period of time and then quenched in water. After this step it is further thermomechanically worked to a final desired shape at a temperature typically below the alpha/alpha+beta transus temperature.

For Zircaloy material that is to be used as tubular cladding for fuel pellets, the intermediate billet may be beta treated by heating to approximately 1050° C. and subsequently water quenched to a temperature below the alpha+beta to alpha transus temperature.

Depending upon the size and shape of the intermediate product at this stage of fabrication, the billet may first be alpha worked by heating it to about 750° C. and then forging the hot billet to a size and shape appropriate for extrusion. Once it has attained the desired size and shape (substantially round cross-section), the billet is prepared for extrusion. This preparation includes drilling an axial hole along the center line of the billet, machining the outside diameter to desired dimensions, and applying a suitable lubricant to the surfaces of the billet. The billet diameter is then reduced by extrusion at 700° C. or greater through a frustoconical die and over a mandrel. The as-extruded cylinder may then be optionally annealed at about 700° C. Before leaving the primary fabricator the extruded billet may be cold worked by pilgering to further reduce its wall thickness and outside diameter. At this stage the intermediate product is known as a TREX (Tube Reduced Extrusion). The extrusion or TREX may then be sent to a tube mill for fabrication into the final product.

At the tube mill the extrusion or TREX goes through several cold pilger steps with anneals at about 675°–700° C. between each reduction step. After the final cold pilger step the material is given a final anneal which may be a full recrystallization anneal, partial recrystallization anneal, or stress relief anneal. The anneal may be performed at a temperature as high as 675°–700° C. Other tube forming methods such as sinking, rocking and drawing may also completely or partially substitute for the pilgering method.

Thin-walled members of Zircaloy-2 and Zircaloy-4 alloys, such as nuclear fuel cladding, processed by the above-described technique, have a resultant structure which is essentially single phase alpha with intermetallic particles (i.e. precipitates) containing Zr, Fe, and Cr, and including Ni in the Zircaloy-2 alloy. The precipitates for the most part are randomly distributed, through the alpha phase matrix, but bands or "stringers" of precipitates are frequently observed. The larger precipitates are approximately 1 micron in diameter and the average particle size is approximately 0.3 microns (3000 angstroms) in diameter.

In addition, these members exhibit a strong anisotropy in their crystallographic texture which tends to preferentially align hydrides produced during exposure to high temperature and pressure steam in a circumferential direction in the alpha matrix and helps to provide the required creep and tensile properties in the circumferential direction.

The alpha matrix itself may be characterized by a heavily cold worked or dislocated structure, a partially recrystallized structure or a full recrystallized structure, depending upon the type of final anneal given the material.

Where final material of a rectangular cross section is desired, the intermediate billet may be processed substantially as described above, with the exception that the reductions after the beta solution treating process are typically performed by hot, warm and/or cold rolling the material at a temperature within the alpha phase or just above the alpha to alpha+beta transus temperature. Alpha phase hot forging may also be performed. Examples of such processing techniques are described in U.S. Pat. No. 3,645,800.

It has been reported that various properties of Zircaloy alloy components can be improved if beta treating is performed on the final size product or near final size product, in addition to the aforementioned conventional beta treatment that occurs early in the processing. Examples of such reports are as follows: U.S. Pat. No. 3,865,635 and U.S. Pat. No. 4,238,251. Included among these reports is the report that good Zircaloy-4 alloy corrosion properties in high temperature steam environments can be achieved by retention of at least a substantial portion of the precipitate distribution in two dimensional arrays, especially in the alpha phase grain boundaries of the beta treated microstructure. This configuration of precipitates is quite distinct from the substantially random array of precipitates normally observed in alpha worked (i.e. below approximately 1450° F.) Zircaloy final product where the beta treatment, if any, occurred much earlier in the breakdown of the ingot as described above. The extensive alpha working of the material after the usual beta treatment serves to break up the two dimensional arrays of precipitates and distribute them in the random fashion typically observed in alpha-worked final product.

It has been found that conventionally processed, alpha worked Zircaloy cladding (tubing) and channels (plate) when exposed to high temperature steam such as that found in a BWR (Boiling Water Reactor) or about 450° to 500° C., 1500 psi steam autoclave test have a propensity to form thick oxide films with white nodules of spalling corrosion product, rather than the desirable thin continuous, and adherent, substantially black corrosion product needed for long term reactor operation.

According to the present invention it has surprisingly been found that small modifications made to conventional processing of Zircaloy alloys provide significantly improved high temperature steam corrosion resistance while maintaining the substantially random distribution of precipitates and strong anistropic texture observed in conventionally alpha worked Zircaloy final product. It is believed that if beta treating is performed at or near the conventional early stage of processing, that limiting the elevation of the subsequent alpha working and annealing temperatures, and/or the time at temperature, will provide final product with the required corrosion resistance. It has been observed in final product according to the present invention that the average precipitate size has been reduced substantially below that observed in conventionally processed alpha worked product. It has been found that if these subsequent alpha working and annealing temperatures are limited to below approximately 600° to 625° C. that intermediate and final product having precipitate sizes significantly below that observed in conventionally processed Zircaloy are produced. Articles, thus processed have been found to exhibit significantly lower corrosion weight gains in comparison with conventionally processed material in high temperature steam tests.

These and other aspects of the invention will become more apparent upon review of the drawings in conjunction with the detailed description of the invention.

DETAILED DESCRIPTION OF THE INVENTION

Figure 1:
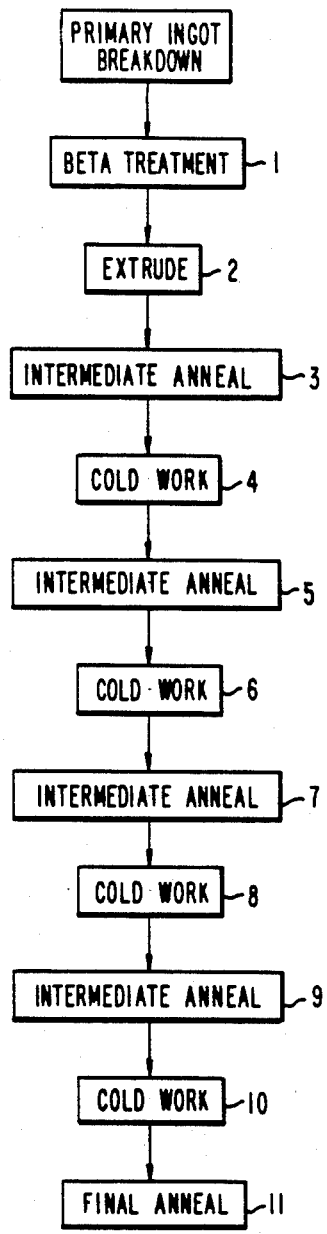
FIG. 1 shows a process flow diagram of an embodiment of the present invention.

In accordance with the present invention, material from a heat of nuclear grade Zircaloy-4 material was fabricated as shown in the process outline flow diagram of FIG. 1. A Zircaloy-4 ingot having the chemistry shown in Table I was broken down by conventional techniques to billets of approximately six inches in diameter. One of these billets was then given a beta treatment 1 which comprised holding it in a furnace set at about 1052° C. (1925° F.) for 1.5 hours and then water quenching it. At this point, it was prepared as usual for extrusion. The hollow Zircaloy-4 billet was then heated to about 600°-625° C. and extruded to an extrusion having an outside diameter of 2.5 inches and a wall thickness of 0.430 inches. It will be noted that the extrusion temperature was reduced by about 100° C. below that conventionally utilized in the belief that the lowering of the extrusion temperature should reduce the tendency of the precipitates between the alpha lamellae of the beta treated structure to agglomerate. The heating time and time at temperature should also be preferably minimized for this reason. Induction heating and other rapid heating methods are therefore preferred. The extrusion temperature may of course be lower than that utilized here to further limit precipitate agglomeration. The lower limit of extrusion temperature is governed by a variety of factors, among which are the ability to extrude the material without cracking and the load capacity of the extrusion apparatus. Extrusion temperatures as low as about 500° C. are presently contemplated. Zircaloy extrusions extruded at about 500° C. have been found to have improved high temperature, high pressure steam corrosion resistance compared to material extruded at about 600° C.

In the next step, 3, the 600° C. extruded intermediate product was annealed at 600° C. for 4 hours in preparation for the first cold pilgering reduction, step 4.

The object of this intermediate anneal (and the following intermediate anneals, steps 5, 7 and 9) is to restore enough ductility to the intermediate product to allow it to be cold pilgered without cracking, while also minimizing precipitate coarsening. The degree of precipitate coarsening is a function of the temperature and the time at that temperature, therefore both variables should be minimized to the extent possible. It is believed that these intermediate anneals can be as low as about 500° C.

After the step 3 intermediate anneal, the extrusion was pilgered in step 4 to a TREX having a 1.75 inch outside diameter and a wall thickness of 0.3 inch. The TREX was then annealed for 8 hours at 578° C. (1072° F.) in step 5, and then cold pilgered to a 1.25 inch outside diameter and a 0.2 inch wall thickness in step 6. The tube shell then received another intermediate anneal, step 7, identical to the step 5 intermediate anneal. It was then further cold pilgered in step 8 to a 0.7 inch outside diameter, 0.07 inch wall thickness tube shell, and then annealed again (step 9) as in steps 5 and 7. The tube shell then received a final cold pilgering pass in step 10 to produce a 0.423 inch outside diameter and a 0.025 inch wall thickness. A portion of this material then received a final anneal (step 11) of 7.5 hours at 466° C. (870° F.) to stress relieve the material. Another portion of this material received a full recrystallization anneal (step 11) at 550° C. for 2 hours.

Figure 2A:
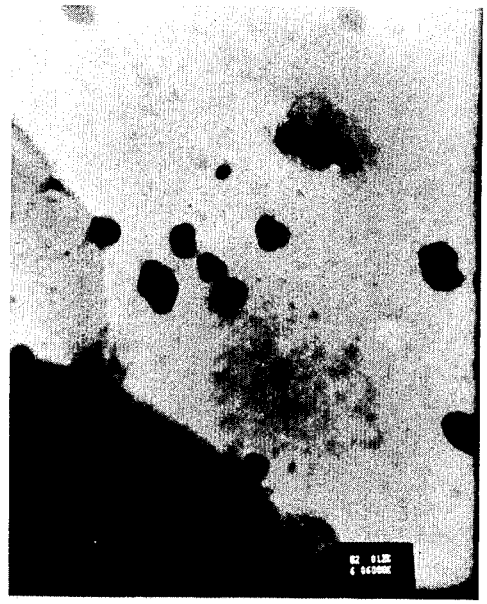
FIGS. 2A, B, C, D, E and F show transmission electron microscopy photomicrographs showing the typical precipitate distribution and size observed in an embodiment of article according to the present invention.
Figure 2B:
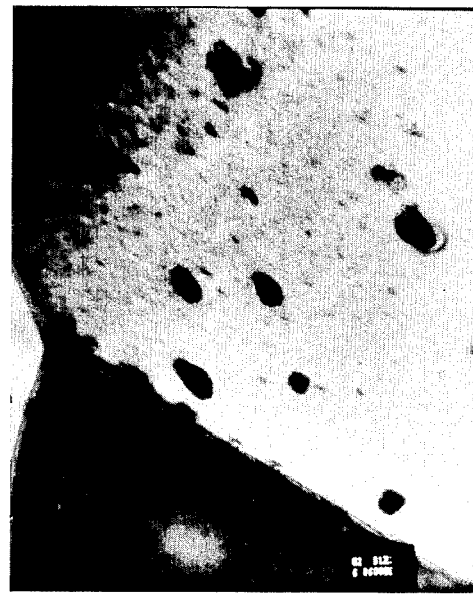
Figure 2C:
Figure 2D:
Figure 2E:
Figure 2F:
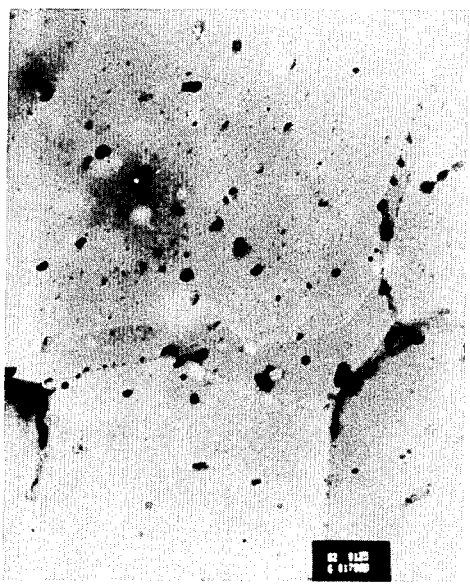

Thin foils were prepared from both the stress relief annealed material and the fully recrystallized material and evaluated via TEM (transmission electron microscopy). The stress relieved material contained dense networks of dislocations making it difficult to assess the size and distribution of precipitates in the material. The precipitates, however, were observable in the fully recrystallized material and were found to be substantially, randomly distributed throughout the alpha matrix. Typical microstructures observed are shown in FIGS. 2A (60,000X), 2B (60,000X), 2C (4600X), 2D (8000X), 2E (10,000X) and 2F (17,000X). Precipitate size was also measured and found to average about 0.077 microns (770 angstroms) with a standard deviation of about 0.035 microns. Precipitate size measurements performed on another section of tubing produced an average precipitate diameter of about 500 angstroms. These observations show that material processed in accordance with the present invention possess a reduced precipitate size compared to that observed in conventionally processed Zircaloy. This improvement in precipitate size is believed to be due to the lower extrusion, intermediate anneal and final anneal temperatures utilized after beta treatment, in combination with the extensive amount of deformation which the material receives after beta treatment.

The stress relieved tubing material processed in the above manner was corrosion tested in an autoclave for 5 days in 454° C. (850° F.), 10.3 MPa (1500 psi) steam, with conventionally processed, stress relieved, Zircaloy-4 tubing. It is clear from a review of Table II that the material in accordance with the present invention is significantly more corrosion resistant to high temperature, high pressure steam than the reference (or conventionally processed) Zircaloy-4 tubing. Weight gains of the material according to the present invention are more than an order of magnitude lower than those produced on the conventionally processed material. Based on this high temperature, high pressure corrosion test results it is believed that final product in accordance with the present invention will have superior boiling water reactor corrosion properties compared to conventional material. Based on the above results it is believed that the average precipitate size should be maintained below about 1100 angstroms (mean precipitate size plus standard deviation) and more preferably below about 800 angstroms to provide assurance of adequate corrosion resistance.

Figure 3:
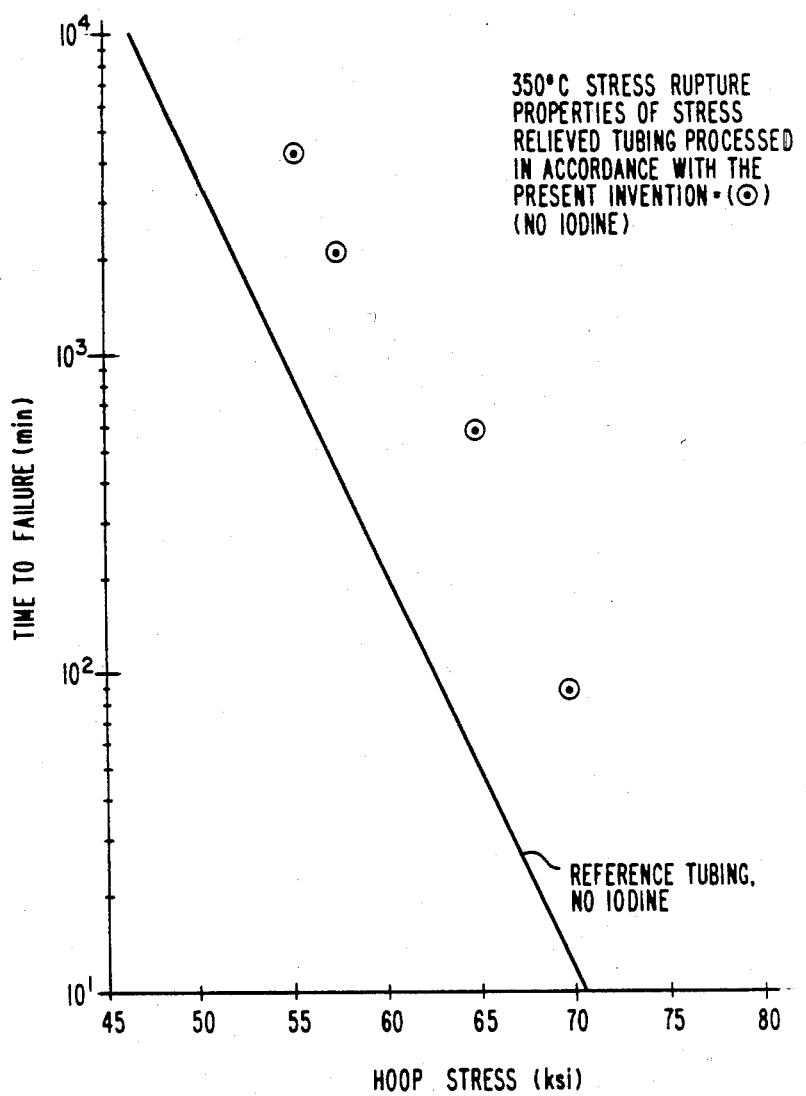
FIG. 3 shows a graph of the stress rupture properties of Zircaloy-4 stress relieved tubing processed in accordance with the present invention compared to stress relieved tubing conventionally processed.

In addition to the above improvements in corrosion properties and microstructures, 350° C. stress rupture test results of the above described stress relieved tubing indicate that this material may also have improved stress rupture properties compared to reference tubing. FIG. 3 provides a comparison of the 350° C. stress rupture properties of the above stress relieved tubing compared to conventionally processed Zircaloy-4 stress relieved in the same manner.

TABLE I

Composition of Zircaloy-4 Heat Processed in Accordance with the Present Invention*

| Element | | | | | |
|---|---|---|---|---|---|
| Sn | 1.49 | w/o | | | |
| Fe | 0.21 | w/o | | | |
| Cr | 0.11 | w/o | | | |
| Fe + Cr | 0.33 | w/o | | | |
| O | 1130 ppm | | | (1350)** | |
| Impurities (in PPM) | | | | | |
| Al | 55 | W | <25 | Ni | <35 |
| B | 0.2 | H | 5 (14) | Pb | <25 |
| C | 147 | Hf | 66 | Cb | <50 |
| Cd | <0.2 | Mg | <10 | Si | 82 |
| Cl | <5 | Mn | <25 | Ta | <100 |
| Co | <10 | Mo | <10 | Ti | <25 |
| Cu | 22 | N | 23 (37) | U | 0.8 |
| | | | | V | <25 |

*Average of analyses taken from a number of positions on the ingot.
**Analyses in parentheses were performed on a TREX.

TABLE II

Corrosion Test Results After Five Days Exposure to 454° C. 1500 psi Steam

| Material | Weight Gain (mg/dm$^2$) | Corrosion Rate (mg/dm$^2$/day) | Visual Appearance |
|---|---|---|---|
| Present Invention (Abraded) | 249 | 49.8 | Continuous and Adherent Oxide Film |
| Present Invention (Pickled) | 167 | 33.4 | Continuous and Adherent Oxide Film |
| Reference ZR-4 (Abraded) | 3554 | 710.8 | Spalling White Nodules |

While the advantages of the present invention have been demonstrated with respect to Zircaloy-4 tubing, it is believed that the present invention is also applicable to Zircaloy-2 alloys, as well as other alpha zirconium tubing, and to Zircaloy and other alpha zirconium plate and sheet material. Normally rectangular material is beta quenched as about a 4 inch thick rectangular billet and then hot worked, typically by heating the billet to approximately 780° C. and then hot rolling it in a number of passes, with reheats as needed. Final size is attained by cold rolling.

It is believed that if this hot rolling temperature is reduced to about 600° C. or less the advantages of the present invention can also be obtained in channel plate and sheet. It is presently contemplated that beta treating may be performed at the 0.75 inch thick stage rather than the 4 inch stage. The material would then be hot rolled in a number of passes at a temperature below about 600° C. to a thickness of approximately 0.25 inches. This material would then be cold rolled to final size with anneals at about 600° C., or less, as needed.

It is understood that the above specification and drawings are exemplary and not a limitation of the invention whose scope is defined by the following claims.

We claim:

1. A final size Zircaloy alloy, nuclear fuel cladding tube comprising:
    said Zircaloy alloy selected from the group consisting of Zircaloy-2 and Zircaloy-4;
    a microstructure adjacent to the outer circumferential surface of said fuel cladding tube, said microstructure containing precipitates;

said precipitates having an average size below about 1100 angstroms and distributed substantially randomly throughout said microstructure;

the outer circumferential surface of said fuel cladding tube characterized by excellent nodular corrosion resistance as evidenced by a uniform, continuous and adherent oxide film after five days exposure to a 454° C. 10.3 MPa steam test.

2. The final size Zircaloy alloy, nuclear fuel cladding tube according to claim 1 wherein said precipitates have an average size below about 800 angstroms.

3. The final size Zircaloy alloy, nuclear fuel cladding tube according to claim 1 wherein said microstructure further containing a cold worked and stress relieved grain structure.

4. The final size Zircaloy alloy, nuclear fuel cladding tube according to claim 3 wherein said precipitates have an average size below 800 angstroms.

5. The final size Zircaloy alloy fuel cladding tube according to claim 1 further comprising anisotropic crystallographic texture.

6. The final size Zircaloy alloy, nuclear fuel cladding tube according to claim 5 wherein said precipitates have an average size below 800 angstroms.

7. The final size Zircaloy alloy, nuclear fuel cladding tube according to claim 1 wherein said microstructure containing a fully recrystallized grain structure.

8. The final size Zircaloy alloy, nuclear fuel cladding tube according to claim 7 wherein said precipitates have an average size below 800 angstroms.

9. A final size Zircaloy alloy, water reactor component comprising:

said Zircaloy alloy selected from the group consisting of Zircaloy-2 and Zircaloy-4;

a microstructure containing precipitates;

said precipitates having an average size below about 1100 angstroms and distributed substantially randomly throughout said microstructure;

said water reactor component characterized by excellent nodular corrosion rsistance as evidenced by a uniform, continuous and adherent oxide film after five days exposure to a 454° C. 10.3 MPa steam test.

10. The final size Zircaloy alloy water reactor component according to claim 9 wherein said precipitates have an average size below about 800 angstroms.

11. The final size Zircaloy alloy water reactor component according to claim 9 wherein said microstructure further containing a cold worked and stress relieved grain structure.

12. The final size Zircaloy water reactor component according to claim 11 wherein said precipitate have an average size below 800 angstroms.

13. The final size Zircaloy alloy water reactor component according to claim 9 further comprising anisotropic crystallographic texture.

14. The final size Zircaloy water reactor component according to claim 13 wherein said precipitates have an average size below 800 angstroms.

15. The final size Zircaloy water reactor component according to clain 9 wherein said microstructure containing a fully recrystallized grain structure.

16. The final size Zircaloy water reactor component according to claim 15 wherein said precipitates have an average size below 800 angstroms.

* * * * *